(12) United States Patent
Skelcher

(10) Patent No.: US 6,502,841 B1
(45) Date of Patent: Jan. 7, 2003

(54) TRACTOR MUDGUARD

(75) Inventor: Michael D. Skelcher, Essex (GB)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/543,064

(22) Filed: Apr. 5, 2000

(30) Foreign Application Priority Data

Apr. 17, 1999 (GB) .............................................. 9908751

(51) Int. Cl.⁷ .............................................. B62D 25/16
(52) U.S. Cl. ...................................... 280/156; 280/157
(58) Field of Search ............................... 280/847, 848, 280/851, 156, 157

(56) References Cited

U.S. PATENT DOCUMENTS

| | | | | |
|---|---|---|---|---|
| 657,972 A | * | 9/1900 | Ward | 280/157 |
| 2,947,375 A | * | 8/1960 | Lehmann | 280/847 |
| 3,876,229 A | * | 4/1975 | Kohn et al. | 280/847 |
| 4,362,310 A | * | 12/1982 | Goodall | 280/157 |
| 5,074,573 A | * | 12/1991 | Dick | 280/157 |
| 5,169,167 A | * | 12/1992 | Willson et al. | 280/157 |
| 5,794,956 A | * | 8/1998 | Hurlburt et al. | 280/156 |
| 6,007,102 A | * | 12/1999 | Helmus | 280/847 |
| 6,349,954 B1 | * | 2/2002 | Deziel | 280/156 |

FOREIGN PATENT DOCUMENTS

| | | | | |
|---|---|---|---|---|
| DE | 517681 | * | 1/1931 | 280/156 |
| DE | 3918387 | * | 12/1990 | B62D/25/16 |
| FR | 659273 | * | 6/1929 | 280/156 |
| JP | 59-153662 | * | 9/1984 | 280/156 |

* cited by examiner

Primary Examiner—Frank Vanaman

(57) ABSTRACT

A tractor has a mudguard overlying a steerable wheel of the tractor. The mudguard is mounted for rotation with the wheel about a generally vertical axis and for pivotal movement relative to the wheel about a generally horizontal axis parallel to the rotational axis of the wheel. A cam causes the mudguard to pivot about the horizontal axis at least when the wheel is approaching one of its maximum steering lock positions.

6 Claims, 3 Drawing Sheets

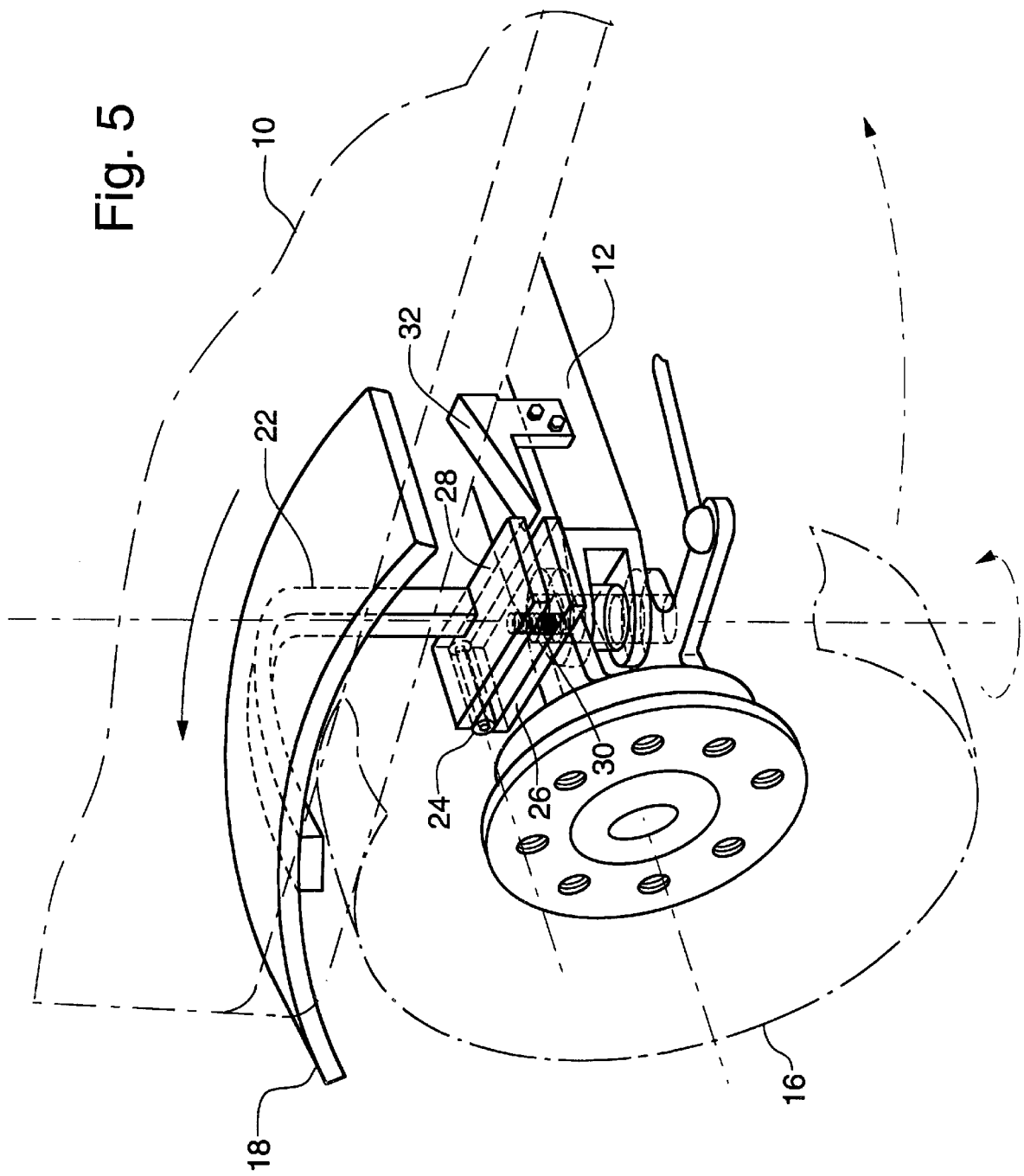

TRACTOR MUDGUARD

FIELD OF THE INVENTION

The present invention generally relates to a tractor having a mudguard or fender mounted above a steerable wheel of the tractor, and more particularly, to a tractor fender that is pivotable relative to the steerable wheel.

BACKGROUND OF THE INVENTION

If in a tractor the mudguards of the steerable wheels are mounted in a fixed position in relation to the body, then they do not offer adequate protection while the tractor is being steered. For this reason, the mudguards have previously been mounted on the axle for movement with the wheels about a generally vertical axis. There is however a problem with such an arrangement in that the steerable wheels of a tractor can rotate to a point where they come very close to the body of the tractor. For this reason, if the mudguards are fixed in relation to the wheel, they tend to foul the body when the wheel is near its maximum steering lock. Of course, such fouling must be avoided to prevent damage and in order not to restrict the turning circle of the tractor.

In order to avoid the mudguards of steerable wheels fouling the body of tractor, it has already been proposed to provide complex linkages that steer the mudguards about a vertical axis relative to the axle and the wheel during steering movements so that in effect the mudguard rotates through a smaller angle than the wheel and avoids collision with the tractor body. In its simplest form, such a linkage can merely introduce a lost motion between the mudguard and the wheel at the end of its travel to allow the mudguard to come to a rest away from the tractor body while the steerable wheel continues to rotate. In more complex linkages, the mudguard constantly rotates through a smaller angle than the steerable wheel over the entire steering range.

Apart from the complexity inherent in such prior art proposals, they have the disadvantage that the mudguard does not fully overlie the wheel at the limit of steering movements and its effectiveness when the tractor is on full steering lock is reduces.

SUMMARY OF THE INVENTION

With a view to mitigating the foregoing disadvantages, the present invention provides a tractor having a mudguard overlying a steerable wheel of the tractor, wherein the mudguard is mounted for rotation with the wheel about a generally vertical axis and for pivotal movement relative to the wheel about a generally horizontal axis parallel to the rotational axis of the wheel and wherein means are provided for causing the mudguard to pivot about the said horizontal axis at least when the wheel is approaching one of its maximum steering lock positions.

The means for causing the mudguard to pivot may suitably comprise a wedge or cam surface fixed to the axle of the steerable wheel and acting on a member fixed in relation to the mudguard.

BRIEF DESCRIPTION OF THE DRAWINGS

The invention will now be described further, by way of example, with reference to the accompanying drawings, in which:

FIG. 5 shows the mounting of a mudguard on a steerable wheel where the cam surface is fixed to the axle so that the mudguard pivots around the wheel as the wheel approaches its maximum steering lock in one direction.

DETAILED DESCRIPTION OF THE PREFERRED EMBODIMENT

Figure 1:
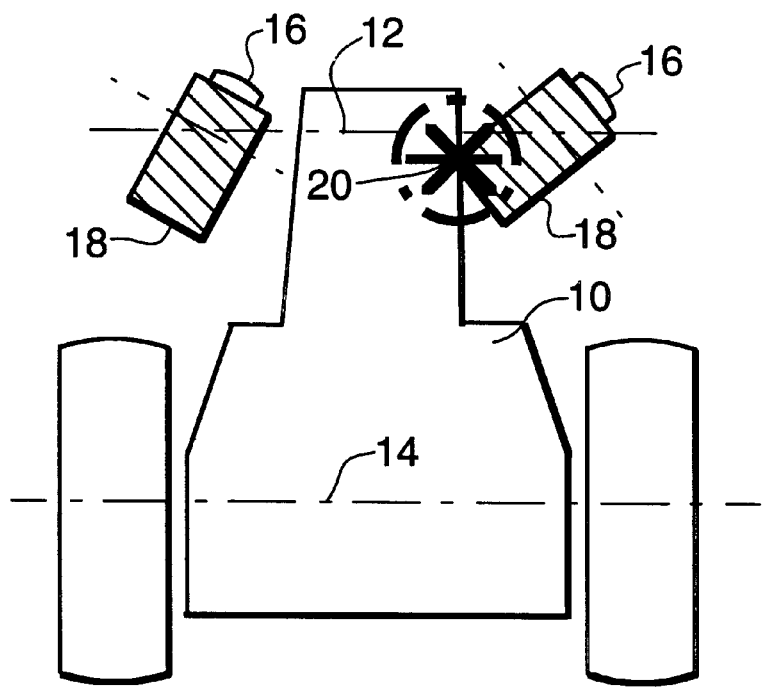
FIG. 1 is a schematic plan view of a tractor, showing the position at which a mudguard risks fouling the body of the tractor, FIG. 2 schematically shows the mounting of a mudguard above a steerable wheel.

FIG. 1 shows a tractor having a body 10 with a front axle 12 and a rear axle 14. The front wheels 16 are steerable and each has a mudguard 18 that rotates with it about a vertical axis. As represented by the circle designated 20, there is a risk of the mudguard 18 fouling the body 10 when the tractor is being driven with a full steering lock. In the case of the illustrated tractor, it is only the rear end of the mudguard 18 that risks colliding with the tractor body but it is also possible that there may be a risk of fouling at the front end of the mudguard.

Figure 2:
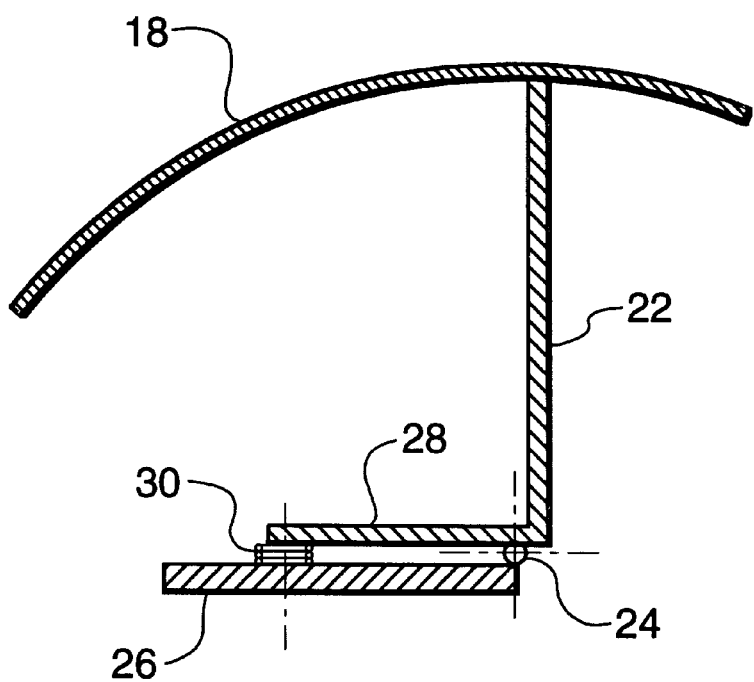

To avoid the mudguard 18 fouling the body of the tractor 10, it is mounted in the manner shown in FIG. 2 on an L-shaped bracket 22 that is secured by the means of a hinge 24 to a plate 26 fixed in relation to the top of the king pin for rotation with the wheel about a vertical axis. The second arm 28 of the L-shaped bracket 28 is connected to the plate 26 by means of a retraction spring 30 that pulls the bracket 22 into the position in FIG. 2.

Figure 3:
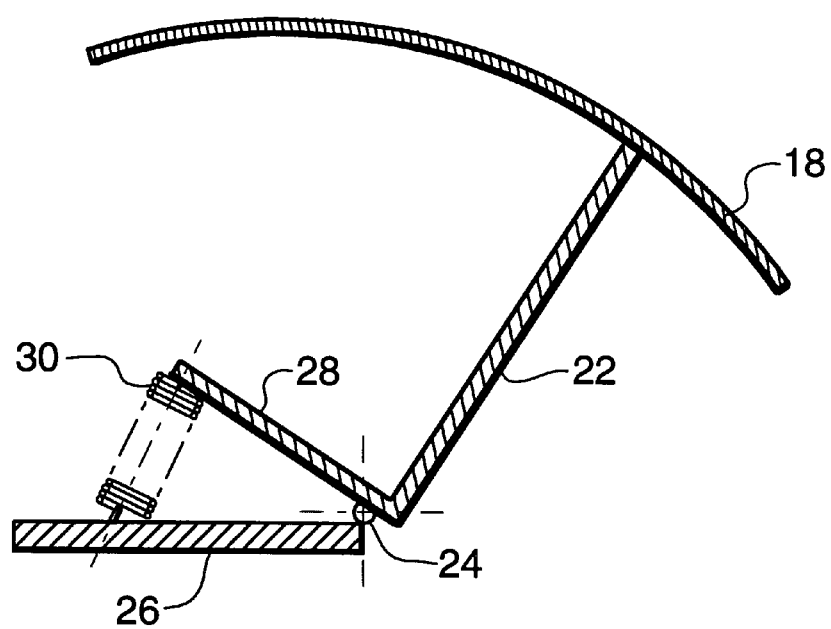
FIG. 3 is generally similar to FIG. 2 and shows the position adopted by the mudguard to avoid the fouling that is shown in FIG. 1, FIG. 4 schematically shows a mechanism for pivoting the mudguard from its position in FIG. 2 to its position in FIG. 3 as the wheel approaches its maximum steering lock in one direction.
Figure 4:
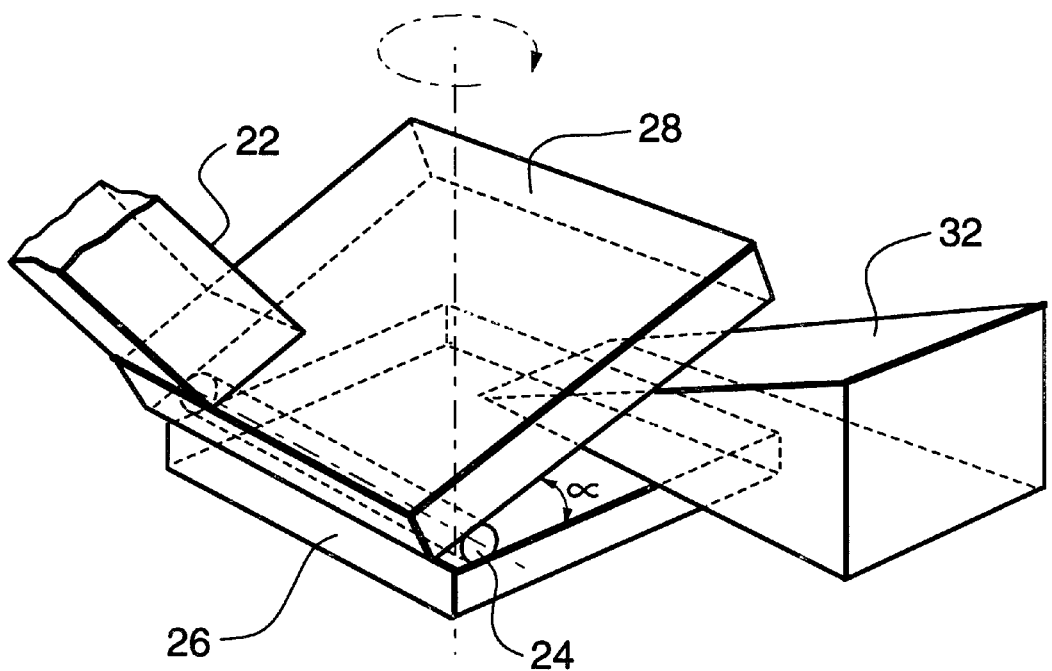

As shown in FIG. 4, a wedge or cam 32 is stationarily mounted on the axle beam to cause the plate 28 to rotate through an angle a about the hinge 24 when the wheel approaches its maximum steering lock. This causes the bracket 22 to rotate about the wheel axis into the position shown in FIG. 3 in which the rear end of the mudguard is pushed forwards to avoid fouling of the tractor body. In this position the mudguard 18 remains above the wheel and continues provide protection against the spraying of mud.

While the arrangement of a wedge has only been described with reference to pivoting the mudguard 18 forward when its rear end risks fouling the vehicle body, it is possible in an analogous way to provide for the mudguard to pivot backwards if its front end should risk fouling the tractor body.

While a wedge or a cam surface 32 fixed to the axle provides a convenient manner of tilting the mudguard about the wheel, it will be appreciated that lever linkages may be used to achieve the same effect of pivoting the mudguard to avoid its rear or front end from fouling the tractor body when the steerable wheel that it overlies approaches a maximum steering lock position.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A tractor comprising:

a mudguard overlying a steerable wheel of the tractor, wherein the mudguard is mounted for rotation with the wheel about a generally vertical axis and for pivotal movement relative to the wheel about a generally horizontal axis parallel to the rotational axis of the wheel; and a pivot assembly causing the mudguard to pivot about the horizontal axis at least when the wheel is approaching one of its maximum steering lock positions and to automatically retract to an initial position after pivotal movement about the horizontal axis, said pivot assembly including:

an L-shaped bracket having first arm and a second arm; and a plate secured to one end of the second arm by a hinge and to another end of the second arm by a retractable spring, wherein the plate rotates with the wheel about the vertical axis and the retractable spring pulls and the first arm into perpendicular alignment with the plate.

2. The tractor according to claim 1, wherein a cam surface fixed to an axle of the steerable wheel causes the plate to rotate about the hinge.

3. The tractor according to claim 2, wherein the cam surface comprises a wedge.

4. In a tractor having a mudguard overlying a steerable wheel of the tractor, wherein the mudguard is mounted for rotation with the wheel about a generally vertical axis and for pivotal movement relative to the wheel about a generally horizontal axis parallel to the rotational axis of the wheel, the tractor, the improvement comprising:

a pivot assembly causing the mudguard to pivot about the horizontal axis at least when the wheel is approaching one of its maximum steering lock positions and to automatically retract to an initial position after pivotal movement about the horizontal axis; said pivot assembly including:

an L-shaped bracket having first arm and a second arm; and a plate secured to one end of the second arm by a hinge and to another end of the second arm by a retractable spring, wherein the plate rotates with the wheel about the vertical axis and the retractable spring pulls the first arm into perpendicular alignment with the plate.

5. The tractor according to claim 4, wherein a cam surface fixed to an axle of the steerable wheel causes the plate to rotate about the hinge.

6. The tractor according to claim 5, wherein the cam surface comprises a wedge.

* * * * *